UNITED STATES PATENT OFFICE.

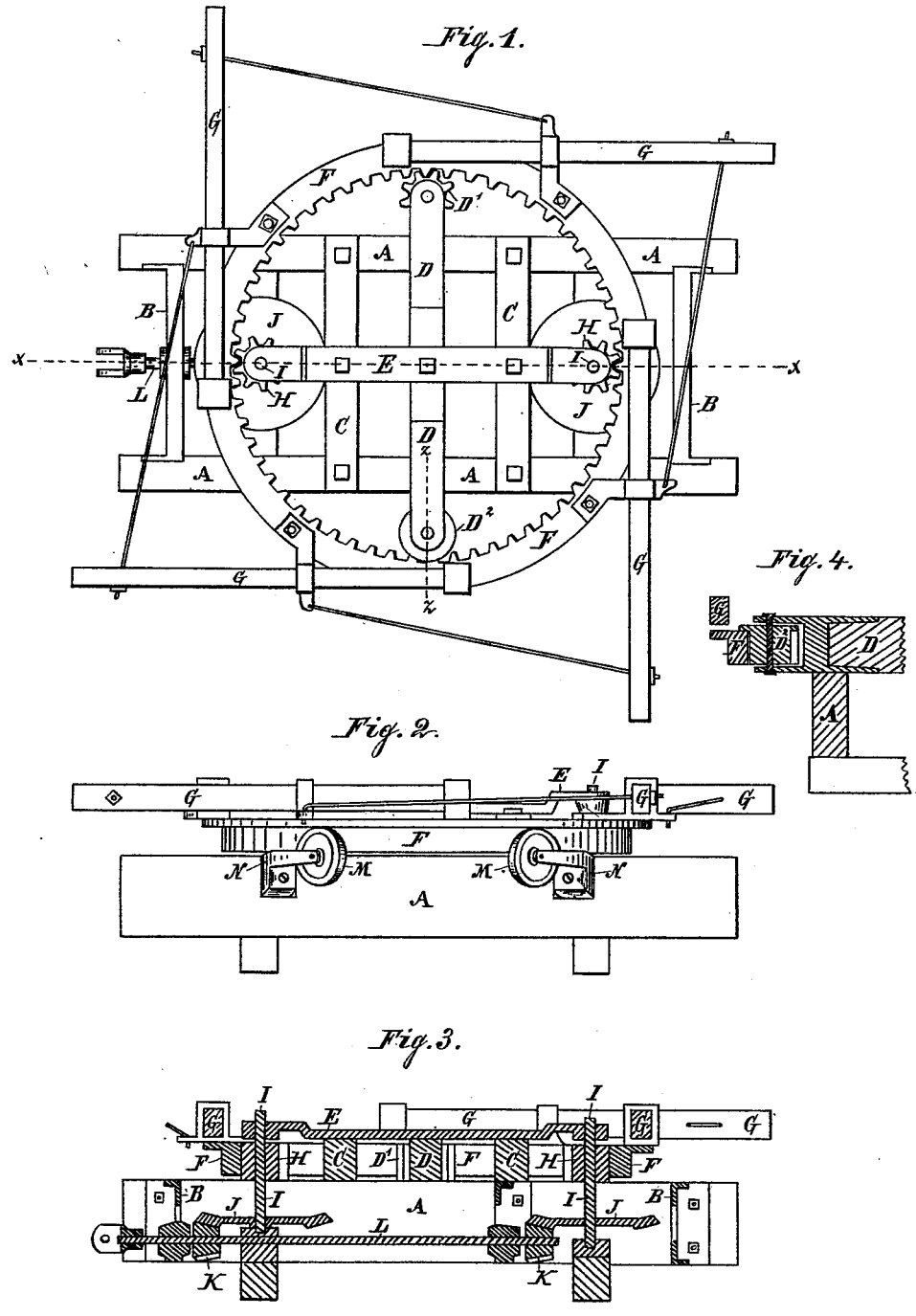

LEWIS W. HASSELMAN, OF INDIANAPOLIS, INDIANA.

HORSE-POWER.

SPECIFICATION forming part of Letters Patent No. 233,413, dated October 19, 1880.

Application filed April 10, 1880. (No model.)

*To all whom it may concern:*

Be it known that I, LEWIS W. HASSELMAN, of the city of Indianapolis, county of Marion, and State of Indiana, have invented certain new and useful Improvements in Horse-Powers, of which the following is a specification.

The object of my invention is to produce an improved form of horse-power for the driving of thrashing-machines, wood-saws, and like purposes, where animal instead of steam power is employed; and it consists, mainly, in a novel arrangement and combination of parts, as will hereinafter be more fully set forth, and embraced in the claims.

Reference is had to the accompanying drawings, forming a part hereof, of which Figure 1 is a top or plan view of a horse-power embodying my invention; Fig. 2, a side elevation thereof; Fig. 3, a longitudinal vertical section on the dotted line $x$ $x$, and Fig. 4 a detail section on the dotted line $z$ $z$.

In said drawings the portions marked A represent the side timbers of the main frame; B, the cross-beams thereof; C, cross-timbers bolted to the tops of the timbers A, to support the bar E; D, a transverse beam between the timbers C, upon the ends of which are the idle-wheels $D'$ $D^2$; E, a longitudinal beam or bar, upon the ends of which are bearings for the vertical shafts, on which are the pinions and face-wheels; F, the master-wheel; G, the draft-levers attached thereto; H, the pinions with which the master-wheel engages; I, the shafts to said pinions; J, the face-wheels of two sets of bevel-gears which drive the power-shaft, and which are also on the shaft I; K, the pinions of said sets of gears, which are mounted on the power-shaft; L, the power-shaft or "tumbling-rod," and M trucks mounted on bearings N, which sustain the master-wheel in position, and on which it moves.

Heretofore horse-powers of this style of mechanism have had the master-wheel provided with heavy cross-arms pivoted to the center of the frame. This has made it difficult to gain a proper bearing for the upper end of the shaft I without raising said arms from the wheel, which cannot be easily done, as the nature of the machine requires that the greatest amount of strength be obtained from the most compact organization, and the raising of these arms would require a heavy and cumbersome blocking between them and the wheel. I avoid these difficulties by the use of the transverse bar D and the idle gears or wheels $D'$ $D^2$, which, with the pinions H H, hold the master-wheel securely in position. These wheels $D'$ $D^2$ are not necessarily gear-wheels, as plain wheels would answer all purposes. They are preferably flanged, as shown most plainly in Fig. 4, to keep the master-wheel from being lifted off the carrier-trucks. There being no cross-arms to interfere, the bar E can be raised up far enough to give the shafts I a firm bearing without destroying the compactness of the machine, and the bearings for the master-wheel being all in contact with its rim, the frame-work inclosed thereby is stationary and may serve as a platform for the driver of the team.

Having thus fully described my said invention, what I claim as new, and desire to secure by Letters Patent, is—

1. In a horse-power, the combination of the carrier-trucks M M, idle-wheels $D'$ $D^2$, and pinions H H, all secured in permanent bearings upon the frame, and arranged, as shown, with the master-wheel F, which is supported solely by said trucks, wheels, and pinions, all substantially as set forth.

2. The combination of the loosely-mounted master-wheel F, having no cross-arms or spokes therein, the two vertical shafts I I, having pinions H H, which engage with the master-wheel in the relation shown, and bevel-gear wheels J J, which engage with the bevel-pinions K K on the horizontal shaft L, when all constructed, arranged, and operating substantially as herein shown and specified.

In witness whereof I have hereunto set my hand, at Indianapolis, Indiana, this 7th day of April, A. D. 1880.

LEWIS W. HASSELMAN.

In presence of—
C. BRADFORD,
W. J. HASSELMAN.